Sept. 1, 1936.  R. E. REASON  2,053,224

PHOTOGRAPHIC CAMERA FOR THREE AND FOUR-COLOR PHOTOGRAPHY

Filed March 28, 1934   6 Sheets-Sheet 1

INVENTOR
Richard Edmund Reason
BY
Arthur J. Kent
his ATTORNEY

Sept. 1, 1936.  R. E. REASON  2,053,224

PHOTOGRAPHIC CAMERA FOR THREE AND FOUR-COLOR PHOTOGRAPHY

Filed March 28, 1934  6 Sheets-Sheet 3

INVENTOR
Richard Edmund Reason
BY
his ATTORNEY

Sept. 1, 1936.　　　R. E. REASON　　　2,053,224
PHOTOGRAPHIC CAMERA FOR THREE AND FOUR-COLOR PHOTOGRAPHY
Filed March 28, 1934　　　6 Sheets-Sheet 4

INVENTOR
Richard Edmund Reason
BY
Arthur L. Kent
his ATTORNEY

Sept. 1, 1936.   R. E. REASON   2,053,224
PHOTOGRAPHIC CAMERA FOR THREE AND FOUR-COLOR PHOTOGRAPHY
Filed March 28, 1934   6 Sheets-Sheet 5
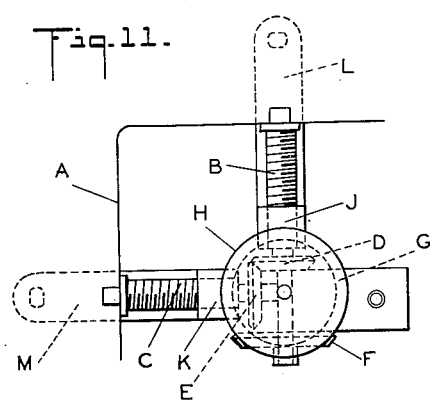
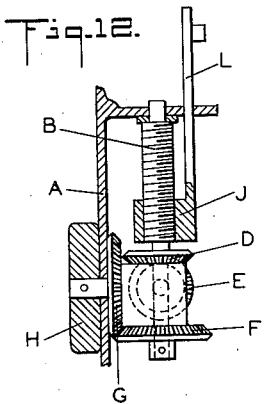
INVENTOR
Richard Edmund Reason
BY
his ATTORNEY

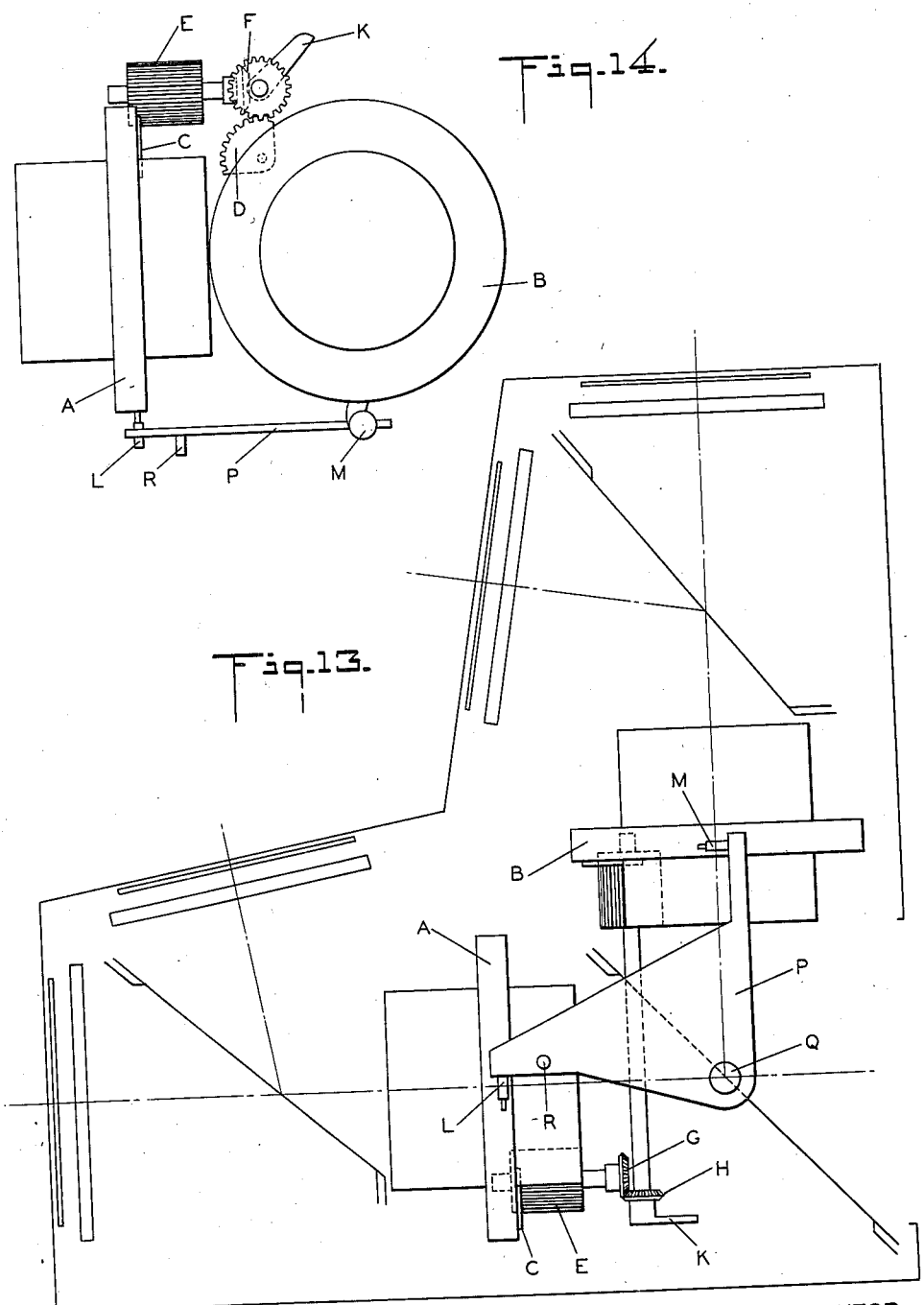

Patented Sept. 1, 1936

2,053,224

UNITED STATES PATENT OFFICE 2,053,224

PHOTOGRAPHIC CAMERA FOR THREE AND FOUR-COLOR PHOTOGRAPHY

Richard Edmund Reason, Leicester, England, assignor to Kapella Limited, Leicester, England, a corporation of England Application March 28, 1934, Serial No. 717,693
In Great Britain March 30, 1933

7 Claims. (Cl. 95—2)

This invention relates to cameras for multi-color photography of the kind adapted to form, on a plurality of sensitive emulsions on plates or the like, images of uniform size of any object, and in which the light entering the camera on what is hereinafter termed the primary axis, is divided, and distributed through appropriate filters to said emulsions, by a plurality of partial reflectors so arranged that the virtual images of the emulsions are substantially coincident, a collective lens being used to form and focus on the emulsions the images of the object.

For convenience the axis of the beam of light impinging on the primary partial reflector is termed the primary axis, the axis of the beam passing unreflected through the primary reflector is termed a secondary axis, as is also the axis of the beam reflected thereby. The axes of the beams from any secondary partial reflectors are similarly termed tertiary axes.

In cameras of this type the light reaching the sensitive plates is only a small fraction of the light reaching the plate or film of an ordinary camera. The light is subdivided by each partial reflector, and further, the light passing the filters is ordinarily not over 20% of the light incident thereon, giving an over-all efficiency of the order of 5 to 10%. For this reason relatively short exposures, such as 1/25 second, are as a rule only practicable with apertures in excess of F/4, and, if the sun is not shining, F/2.5 or more.

Prior forms of multi-color cameras have been of three general types. Those in which the partial reflectors are wholly in front of a series of separate lenses. Those in which the partial reflectors are wholly behind a single lens. Those in which two lens systems are used having a common front component in front of the primary reflector and separate rear components behind such reflector.

If wide-aperture wide-angle lenses are used with the first of the above types, the size of the reflectors required is excessive, so that the camera would be very bulky and clumsy.

With cameras of the second type, wide aperture lenses can only be used if they have a long focal length and hence a narrow angle of field and little depth of focus.

Cameras of the third type as heretofore constructed have been designed to be focussed by moving the common front component of the lens systems relatively to the rear components. This method of focussing is open to serious objections.

In correcting a lens for the various aberrations the degree of separation of the component parts is a vital factor unless the separate parts are corrected independently of each other. The wider the lens aperture the more elements it must have to obtain satisfactory correction, and separate correction requires more elements than joint correction. The more lens elements in the system the greater the loss of light due to internal reflection, etc. Hence, with such a camera, either focussing cannot be carried out without introducing undesirable aberrations on the one hand, or without the use of excessively complicated and inefficient lens systems on the other hand. Further, if focussing by moving the front component only is to be effective, the bulk of the power of the lens must be in the front component with the result that optically such a divided lens system is substantially the same as the one in which the entire lens is in front of the primary reflector, and hence open to the objections inherent in the latter type of camera.

The object of the present invention, therefore, is to provide a compact form and construction of camera adapted to use lenses of wide aperture and normal or short focal length, and capable of being focussed without the introduction of undesirable aberrations or the use of excessively complicated and inefficient lens systems.

This object is attained by placing all or a part of the lens systems behind the primary reflector so that space has to be provided behind such lens systems for only one reflector in place of two and also by focussing by varying the distance between the lens systems as a whole and the holders for the plates, films, or other light sensitive elements.

This construction involves the use of two wholly separate lenses, in the case where all parts of the lens systems are behind the primary reflector, or of two lens systems having a front component in common and separate rear components. The common front component is arranged in front of the primary reflector and the separate rear components are located behind such reflector in the secondary axes.

Ordinarily the construction in which wholly separate lenses are used is employed when normal angles of view are desired. If wider or narrower angles of view are required lens systems having a common front component are used. This front component is dispersive if a wide angle of view is desired and collective if a narrow angle of view is required. Advantageously the camera is constructed so that one or other of three lens systems can be used according to whether the desired angle of view is narrow, medium or wide.

The invention also has for one of its objects the provision of improved means for focussing.

Focussing involves varying the distance between the various lens systems and the holders for the plates or films. This may be done in one or other of two ways. Either the lens systems are moved or the plate holders are moved. Movement of the lens systems gives a cheaper, more rigid but less compact construction. The loss of compactness is due to the fact that when the lenses move, the plate holders are permanently fixed in the position of maximum extension for focussing near objects so that the camera always has its maximum dimensions. When, however, the plate holders move, then the camera can be collapsed to the position in which the extension is a minimum, i.e. focussed for infinity. Also, when the lenses move, the primary reflector has to be larger than when the plate holders move.

Where the lens systems have a front component in front of the primary reflector, and a rear component behind the latter, the two components are necessarily separated as much or more than is desirable to provide space for the primary reflector. Hence, in such cases it is desirable to have the two lens components in fixed position as close to the two sides of the primary reflector as possible and vary the position of the plate holders.

When the plate holders are moved it is desirable also to move the secondary reflector (or each reflector if there are two) in the direction of the secondary axis, since, if that is done, there is no need to provide for separate movement of the plate holder in the tertiary axis at right angles to the secondary axis. Both plate holders and the secondary reflector, which splits the light between them, can be moved as a single unit.

In cameras of this kind as hitherto constructed, where a shutter has been employed it has been placed in the primary axis, where it is least efficient. According to the present invention I prefer to use a plurality of focal plane shutters, each being set in a tertiary axis, although I may use shutters adjacent to the lenses in the secondary axes or a single shutter in the primary axis. Any such plurality of shutters may be synchronously operated. I find that, when I employ pellicle mirrors, the draughts caused by the motions of the shutters are liable to distort said mirrors; and to avoid this I insert between each shutter and pellicle mirror a screen which may be a color filter.

In order that the collective lens in each secondary axis may be corrected, it may be combined with other elements in the manner usual in the construction of photographic lenses.

To enable me to provide lenses of various focal lengths I may also use, in the primary axis, a lens element or combination of elements which may, as a whole, be either collective or dispersive and which, together with each of the lenses in a secondary axis, forms one corrected system. Examples of combinations of this kind are hereafter described.

I illustrate my invention by reference to the accompanying drawings in which:—

Fig. 10 is a front elevation of Fig. 9.

Fig. 11 shows, in side elevation, an alternative means for synchronously displacing the moving elements of a camera of the kind shown in Figs. 7 and 8, or 9 and 10.

Fig. 12 is a front elevation of Fig. 11.

Fig. 13 shows an arrangement for synchronously setting and releasing diaphragm shutters mounted on the secondary axes.

Fig. 14 is a plan view of Fig. 13.

Figure 1:
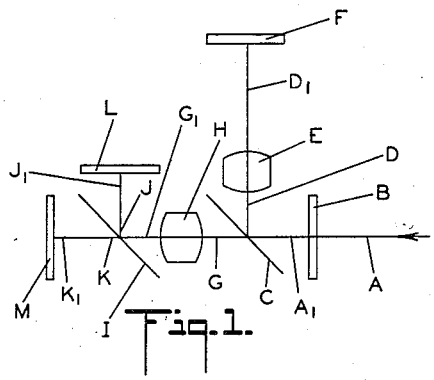
Fig. 1 shows the optical elements of a three-color camera constructed according to the invention, in which the objectives are mounted wholly in the secondary axes.

In the arrangement shown in Fig. 1, A is the primary axis of the system, B is a plain transparent window to protect the contents of the camera, C is the primary partial reflector: D and $D_1$ is the secondary axis formed by reflection from the primary mirror: E is the collective lens in that axis, and is preferably a well corrected photographic lens of suitable focal length: F is a plate carrying a sensitive emulsion in the focal plane of the lens E: G and $G_1$ is the other secondary axis in which is placed a second collective lens H, similar to that at E: I is a secondary partial reflector: J, $J_1$, and K, $K_1$, are tertiary axes in which are placed respectively the emulsions L and M.

Figure 2:
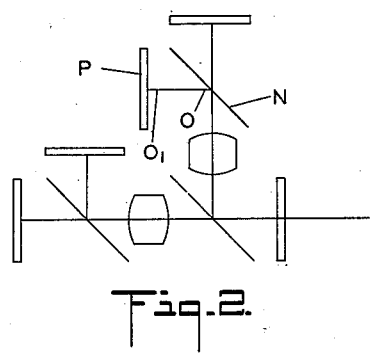
Fig. 2 shows the elements of a camera similar to Fig. 1, adapted for four colors.

The arrangement shown in Fig. 2 corresponds with that shown in Fig. 1, except that it includes a second secondary reflector N which diverts a fraction of the light falling upon it along a tertiary axis O, $O_1$, to a fourth sensitive emulsion P.

Figure 3:
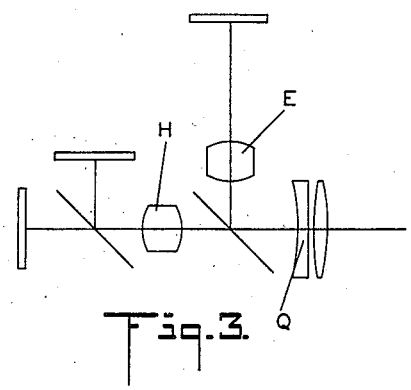
Fig. 3 shows the elements of a camera having a compound dispersive component mounted in the primary axis and collective elements in the secondary axes.

The arrangement shown in Fig. 3 corresponds to that shown in Fig. 1, except that a dispersive lens component Q is placed in the primary axis to form, with the collective lenses H and E respectively, a corrected lens system of shorter focal length than can be obtained by the lenses H and E alone. The lenses H and E have greater power than the corresponding lenses shown in Fig. 1, and are preferably corrected, not independently of, but in combination with, the dispersive component Q, which for this purpose is generally compounded. A lens of the general type suitable for this purpose is described in British Patent Specification No. 388,215.

Figure 4:
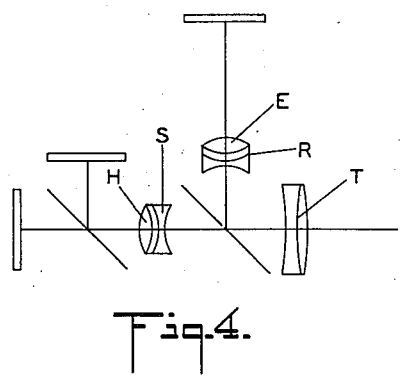
Fig. 4 shows the elements of a camera having a compound collective component in the primary axis and dispersive elements combined with the collective elements in the secondary axes.

The arrangement shown in Fig. 4 corresponds with that shown in Fig. 1, except that, combined with the collective lenses E and H respectively, are dispersive elements R and S, and in the primary axis is a compound collective lens component T which forms, in combination with each of the components H, S, and E, R, a corrected lens system of what is known as the telephoto type. A lens of this type generally suitable for use according to this invention is described in British Patent Specification No. 198,908.

Figure 5:
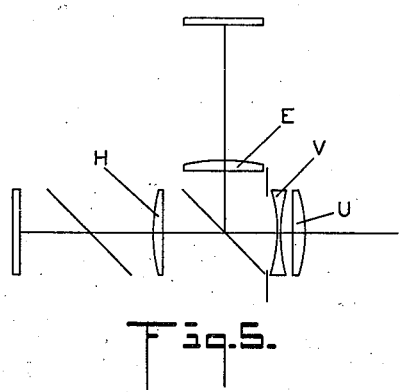
Fig. 5 shows the elements of a camera having single collective elements in the secondary axes, and a compound corrective component in the primary axis.

In the arrangement shown in Fig. 5, the collective lenses H and E in the secondary axes may be single elements as shown, and in the primary axis we place a lens component comprising a collective lens element U and a dispersive lens element V which, together with each of the collective lenses H and E, forms a corrected lens system having a focal length intermediate between that of the arrangement shown in Figs. 1 and 4. A lens system as illustrated in Fig. 5 of a type generally suitable for use according to this invention is described in British Patent Specification No. 15,107/'95.

Figure 6:
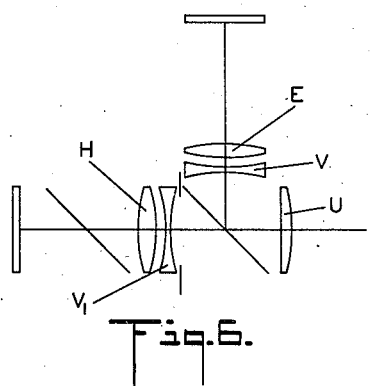
Fig. 6 shows the elements of a camera having a single collective element mounted in the primary axis, and compound corrective components in the secondary axes.

The arrangement shown in Fig. 6 differs from that shown in Fig. 5, in that the dispersive lens element V in Fig. 5, is, in Fig. 6, transferred in duplicate into the secondary axes as lens elements V, $V_1$, the arrangement being such that the collective lens U and each of the compound lens components H, $V_1$, and E, V, forms a properly corrected lens system having a focal length intermediate between those of the systems shown in Figs. 4 and 5. A lens of the type shown in Fig. 6, and generally applicable for the purpose of this invention, is described in British Patent Specification No. 157,037.

In each of the systems shown in Figs. 3, 4, 5, and 6, there is, in either the primary or secondary axes, a lens component comprising collective and dispersive elements so designed that they correct the aberrations of their relative component or components on the other side of the primary reflector. Any such component is hereinafter termed a corrective lens component.

I find that, in order to attain at the same time the largest aperture and the widest angular field, the angle at which the primary reflector must be set to the primary axis, and preferably the angle at which the secondary reflectors must be set to their secondary axes must fall between certain limits, and that the necessary size of the primary reflector is at a minimum when the angle is in the neighborhood of 45 degrees. It can be shown that, for example, for an angular field of 27 degrees and a lens of 2 inches diameter, a primary reflector of minimum size is required when it is set with its normal at slightly less than 45 degrees, that the length of the mirror must be increased about 30 per cent when the angle is 35 degrees; nearly 50 per cent when the angle is 55 degrees, and that neither at 25 degrees nor at 65 degrees can the field be covered by a mirror of any size. It can further be shown that, for an angular field of 14 degrees with a lens of 2 inches diameter, a slightly smaller mirror is required when it is set at 35 degrees, than when it is set at 45 degrees In the camera illustrated by Figs. 7 and 8, A is a casing wherein are mounted pellicle mirrors, B, $B_1$, $B_2$, and to which plate holders $C_1$, $C_2$, $C_3$, $C_4$ are attached.

The lenses are mounted in movable holders D, $D_1$, clamped to shafts E, $E_1$, which slide parallel to the secondary axes through lugs F, $F_1$, etc., fixed to the casing. The shafts are moved endwise by racks G, $G_1$, attached to collars I, $I_1$, rotatable thereon without endwise motion relatively thereto, and engaging with a pinion H which may be rotated from outside the casing by means of a knob J. The lens holders are constrained against rotation by being spring-urged against rollers K, $K_1$, pivoted to the casing. Each lens holder is clamped to its shaft and located by means of a cranked lever L, actuated at one end by the screw O, pivoted at N to the holder, and forked at its other end to engage under a shouldered stud M fixed in the shaft. The lens holder is provided with a groove to seat on the shaft and the lever holds these together. To remove the lens holder the screw is slacked, and the shaft is rotated until the stud is clear of the slot in the lever.

Access to the lenses is secured through apertures P formed in the casing, and covers for the apertures may be provided.

Each lens is provided with an iris which may be actuated through gearing from a pinion Q, rotating in bearings fixed to the casing. The gearing may comprise a toothed wheel R actuating the iris and driven by an idle wheel S attached to the lens holder, and the pinion Q engaging this may be long enough to engage the idle wheel throughout the range of focussing.

Each pinion may be actuated independently by an external knob, or the pinions may be operated in unison, for example by means of the bevel wheels $T_1$, $T_2$, engaging with a bevel wheel $T_3$, mounted on a shaft which is driven by an external knob V through bevel wheels X.

The camera is provided with focal plane shutters, and, for example, a shutter may comprise two blinds $Y_1$, $Y_2$, one being carried on rollers $Z_1$, $Z_3$, and the other on rollers $Z_2$, $Z_4$; the rollers $Z_3$, $Z_4$, being co-axial. The shutters are conveniently wound up in pairs, those exposing the pair of plates common to any secondary axis being provided with a single winding knob. Alternatively the shutters may be wound independently, or all may be operated by one winding knob. The shutters may be held "set" by detents, which are preferably released synchronously by a single trigger, and such trigger may be coupled with said detents by mechanical, pneumatic or electric, or other means.

The shutter blinds $Y_1$, $Y_2$, etc., are shown immediately in front of the plate holders, and the colour filters $W_1$, $W_2$, etc., are mounted between the blinds and the secondary reflectors.

Means comprising a dovetailed seating U, and an eccentrically pivoted clamp $U_1$, are shown for the attachment, in the primary axis, of a frame containing a window or interchangeable lens components and/or a shutter.

Figure 8:
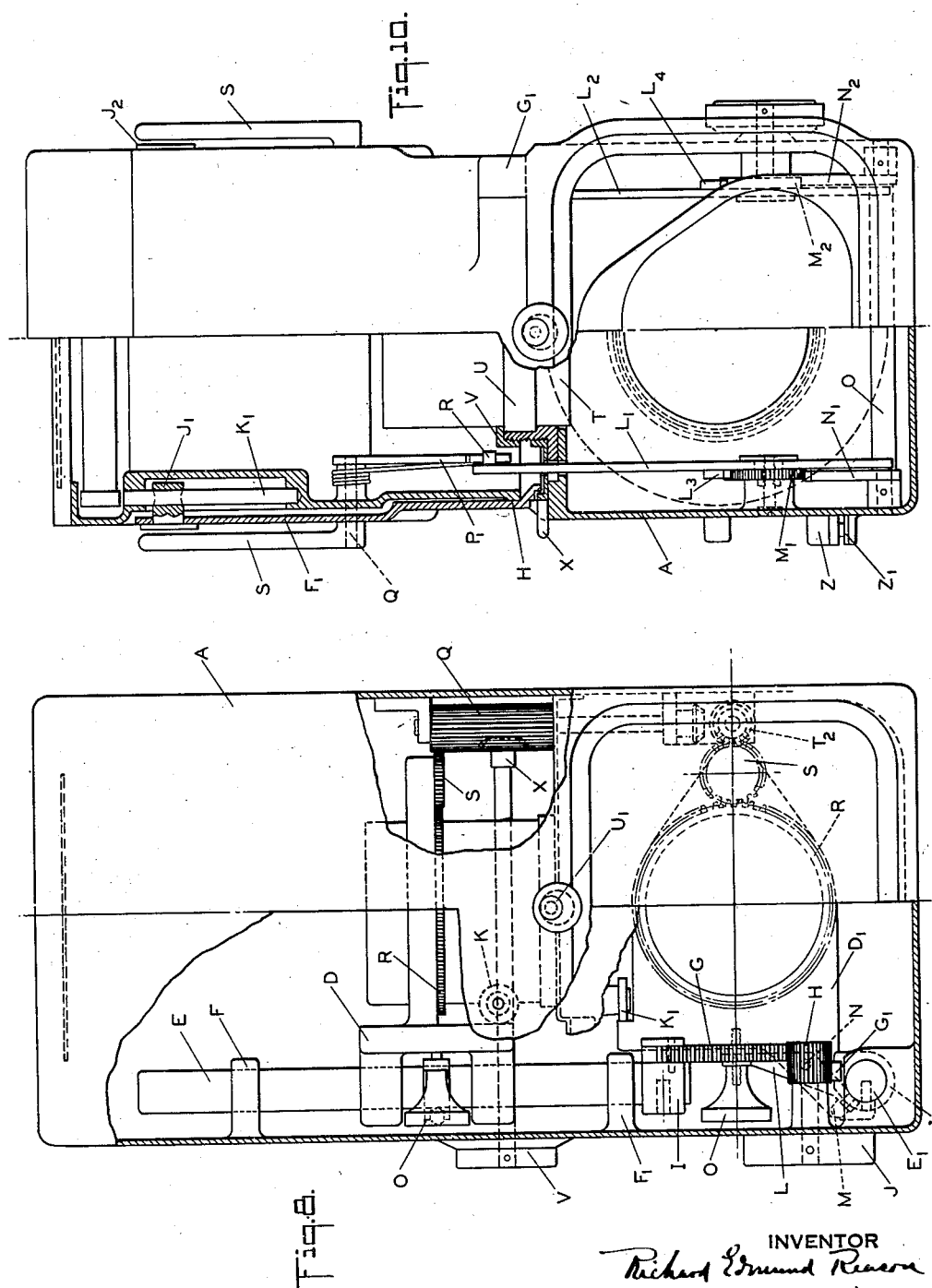
Fig. 8 is the front elevation of Fig. 7.
Figure 9:
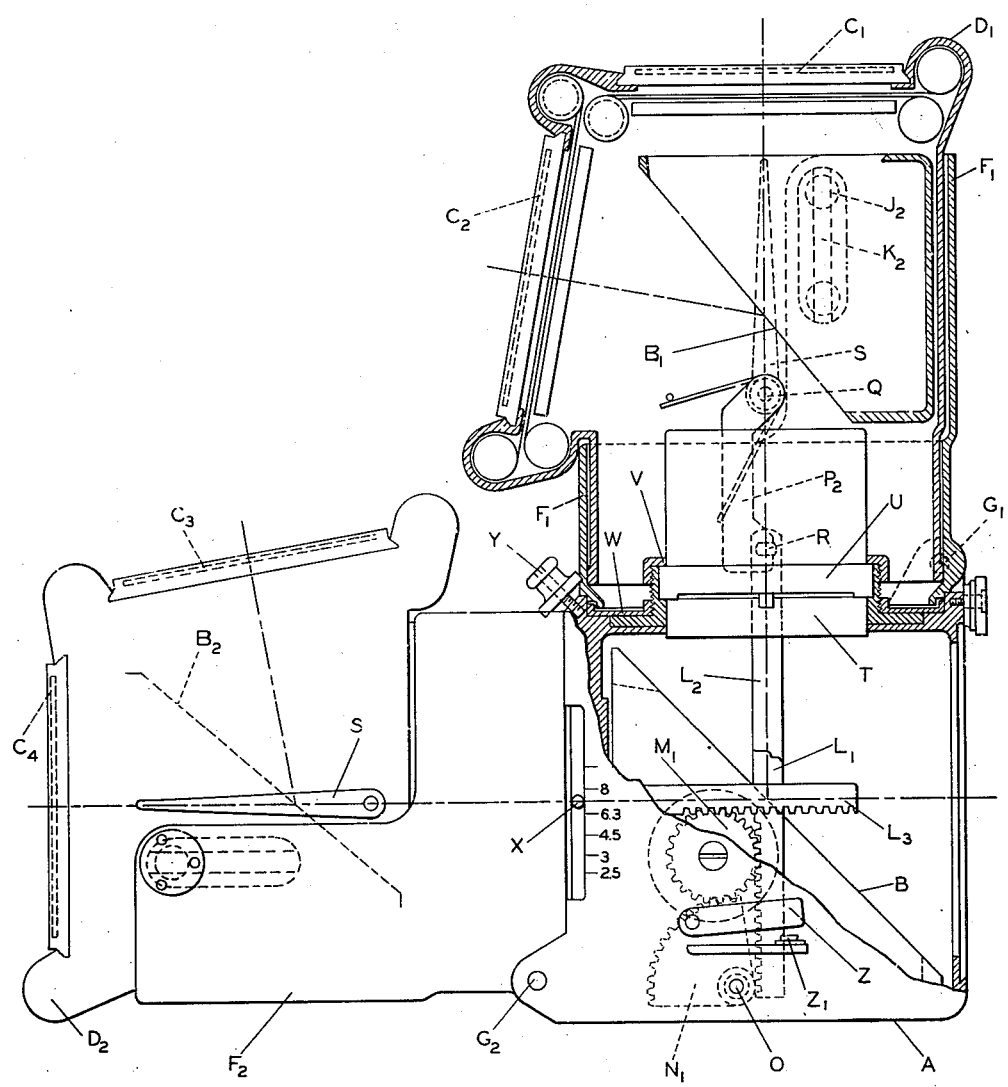
Fig. 9 is a side elevation of a camera in which the emulsions and the secondary reflectors relating thereto are displaced in unison along the secondary axes, for the purpose of focussing.

Figs. 9 and 10 show a camera in which the plates and their respective secondary reflectors are moved along the secondary axes for the purpose of focussing the images. The camera comprises:—a casing A, within which the primary reflector B is fixed. Pivoted to the casing at $G_1$, $G_2$, are sleeves $F_1$, $F_2$, which may be clamped against the casing by means of the screw Y. The plate holders $C_1$, $C_2$, $C_3$, $C_4$, are attached to separate casings $D_1$, $D_2$, adapted to slide endwise within the sleeves, and within which secondary reflectors $B_1$, $B_2$, are fixed. Each slide comprises two separated bearings constituted at one end by a short cylindrical flange H engaging with a cylindrical portion of the adjacent sleeve, and at the other end by two guide rods $K_1$, $K_2$, attached to the casing and adapted to engage with lugs $J_1$, $J_2$, attached to the sleeve. The casing is moved on the slide by means of a pair of racks $L_1$, $L_2$, to which it is connected through a pair of links $P_1$, $P_2$. The racks $L_1$, $L_2$, etc., are driven synchronously by pinions M₁, M₂, which are turned by toothed sectors N₁, N₂, mounted on one shaft O. A focussing knob outside the camera may turn either the shaft or a pinion. The spring-urged connecting links P₁, P₂, are pivoted each at one end to the casing D, and are provided at their other ends with notches R adapted to engage detachably with pins on the racks L₁, L₂. The links may be disengaged manually by the levers S to permit the sleeve and casing to be hinged open. Each lens mount T is provided with a flange U, adapted to engage with a corresponding seating in the camera and to be retained by a threaded cap ring V. The mount may be keyed against rotation and its iris may be adapted to engage with a ring W actuated from outside the camera by means of a radial arm X which may be provided with an index mark reading against an iris scale on the outside of the camera. The rings W may be connected by gearing for synchronous operation. Switch contacts Z, Z₁, may be provided on the camera and adapted to be manually operated so as to release the shutter detents in known manner unnecessary to describe specifically. The pivot G connecting the casing A and the sleeve F may be adapted for easy withdrawal from the camera so that an alternative sleeve and casing with its plate holders etc., may be fitted. Shutters, filters, and means for attaching lens components in the primary axis are provided as described with reference to Figs. 7 and 8.

Figure 7:
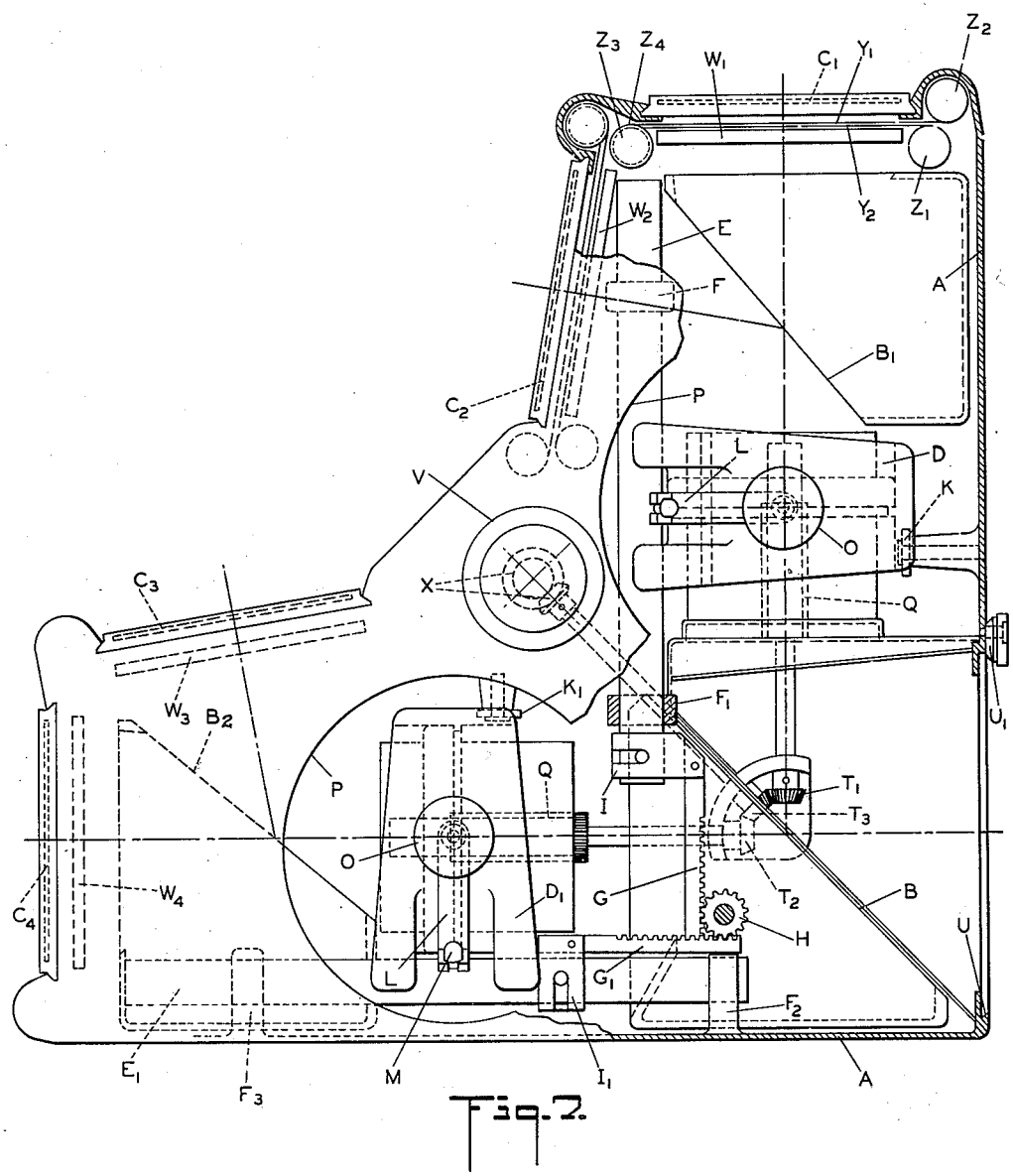
Fig. 7 shows, in side elevation, a four-color camera in which the images are focussed by displacing along the secondary axes the lens elements mounted thereon.

In Figs. 11 and 12 I show alternative means for moving the sliding components of the cameras shown in Figs. 7 to 9 inclusive. A is the camera casing and B, C, are right and left hand lead screws rotating therein, and connected by bevel wheels D, E. The screw B is driven by a focussing knob H through bevel wheels F, G, J. K, are nuts formed on the extremities of the links L, M, which are joined to said sliding components. In other constructions the nuts may rotate and the lead screws may be formed on the links; and the bevel wheels D, E, instead of engaging directly, may each engage the wheel G, whereby the wheel F, may be omitted and both screws may be right or left handed.

Figs. 13 and 14 show a camera including two shutters A and B, (which may be slidably mounted) adapted to be "set" by means of toothed quadrants C and D which engage with pinions E and F mounted on crossed shafts coupled together by means of bevel wheels G, H, and actuated manually by a lever K. The shutters, when set, are held by detents L, M, which are synchronously released by means of a quadrant lever P pivoted to the casing at Q and moved manually by a pin R projecting through the casing.

What is claimed is:

1. A multi-color camera comprising a primary partial reflector to sub-divide a single primary beam of light into two secondary beams, a secondary partial reflector to sub-divide one of said secondary beams into two tertiary beams, holders for light sensitive elements in register with each of said tertiary beams, lens systems comprising front and rear compartments adapted to produce substantially geometrically identical optical images on sensitive elements in said holders, the said rear components being located in said secondary beams, and means for moving said secondary reflector and said holders as a unit in the direction of their associated secondary beam for focussing purposes.

2. A multi-color camera comprising a primary partial reflector adapted to subdivide a single primary beam of light into two secondary beams, at least one secondary partial reflector adapted to subdivide a single secondary beam of light into two tertiary beams, two lens systems comprising a common component in front of the primary reflector, and two rear components a fixed optical distance behind said common component, one in each secondary beam, the front component being adapted to cooperate with each of the rear components to form photographic images on light sensitive elements in holders behind said rear components, the front component and each of the rear components being corrected optically, not separately and independently, but jointly, and single drive means for simultaneously varying the optical distance between the lens system and the holders.

3. A multi-color camera comprising a primary partial reflector adapted to subdivide a single primary beam of light into two secondary beams, at least one secondary partial reflector adapted to subdivide a single secondary beam of light into two tertiary beams, two lens systems comprising a common component fixed in front of the primary reflector, and two rear components fixed in relation thereto, one in each secondary beam, the front component being adapted to cooperate with each of the rear components to form photographic images on light sensitive elements in holders behind said rear components, the front component and each of the rear components being corrected optically, not separately and independently, but jointly, and the front component being dispersive and each of the rear components collective, and single drive means for simultaneously moving the holders relatively to the camera as a whole for the purpose of focusing.

4. A multi-color camera comprising a primary partial reflector adapted to subdivide a single primary beam of light into two secondary beams, at least one secondary partial reflector adapted to subdivide a single secondary beam of light into two tertiary beams, two lens systems comprising a common component fixed in front of the primary reflector, and two rear components fixed in relation thereto, one in each secondary beam, the front component being adapted to cooperate with each of the rear components to form photographic images on light sensitive elements in holders behind said rear components, the front component and each of the rear components being corrected optically, not separately and independently, but jointly, the front component being collective and each of the rear components dispersive, and single drive means for simultaneously moving the holders relatively to the camera as a whole for the purpose of focusing.

5. A multi-color camera comprising a primary partial reflector adapted to subdivide a single primary beam of light into two secondary beams, a secondary partial reflector adapted to subdivide one of said secondary beams into two tertiary beams, two holders for light sensitive elements in register respectively with the two tertiary beams and one in register with the single undivided secondary beam, lens systems in said secondary beams adapted to produce optical images on sensitive elements in said holders, and single drive means for moving, relatively to the primary reflector, said secondary reflector and the two said holders in tertiary beams in the direction of their secondary beam and for moving the third holder in the direction of the other secondary beam for the purpose of focusing.

6. A multi-color camera comprising a primary partial reflector adapted to subdivide a single primary beam of light into two secondary beams, two secondary partial reflectors adapted respectively to subdivide the said secondary beams each into two tertiary beams, four holders for light sensitive elements in register respectively with the four tertiary beams, lens systems in said secondary beams adapted to produce optical images on sensitive elements in said holders, and single drive means for moving, relatively to the primary reflector, each of said secondary reflectors, together with the two holders in register with the tertiary beams formed by it, in the direction of their secondary beam for the purpose of focusing.

7. A multi-color camera comprising a primary partial reflector adapted to subdivide a single primary beam of light into two secondary beams, a secondary partial reflector in one of the secondary beams adapted to subdivide it into two tertiary beams, a plurality of lens systems fixed relative to the primary reflector and having a front component in common placed in the primary beam in front of said primary reflector, and separate rear components in the secondary beams behind said primary reflector, holders for light sensitive elements in register respectively with the two tertiary beams and the undivided secondary beam, and single drive means for simultaneously moving said holders and the secondary reflector relatively for the purpose of focusing.

RICHARD EDMUND REASON.